US012272855B2

(12) United States Patent
Wu et al.

(10) Patent No.: US 12,272,855 B2
(45) Date of Patent: *Apr. 8, 2025

(54) SEMICONDUCTOR DEVICE AND METHODS, WHERE FIRST AND SECOND TRANSMISSION LINES ARE SURROUNDED BY FIRST AND SECOND HIGH-K DIELECTRIC MATERIALS

(71) Applicant: TAIWAN SEMICONDUCTOR MANUFACTURING COMPANY, LTD., Hsinchu (TW)

(72) Inventors: Jiun Yi Wu, Hsinchu (TW); Chien-Hsun Lee, Hsinchu (TW); Chewn-Pu Jou, Hsinchu (TW); Fu-Lung Hsueh, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,202

(22) Filed: May 4, 2023

(65) Prior Publication Data

US 2023/0307813 A1 Sep. 28, 2023

Related U.S. Application Data

(63) Continuation of application No. 17/587,581, filed on Jan. 28, 2022, now Pat. No. 11,664,566, which is a
(Continued)

(51) Int. Cl.
*H01P 3/06* (2006.01)
*H01P 3/02* (2006.01)
(Continued)

(52) U.S. Cl.
CPC ................ *H01P 3/06* (2013.01); *H01P 3/026* (2013.01); *H01P 3/082* (2013.01); *H01P 11/003* (2013.01)

(58) Field of Classification Search
CPC .. H01P 3/08; H01P 3/081; H01P 3/088; H01P 3/026; H01P 3/06; H01P 11/003
(Continued)

(56) References Cited

U.S. PATENT DOCUMENTS

| | | | |
|---|---|---|---|
| 4,798,918 | A | 1/1989 | Kabadi et al. |
| 4,864,722 | A | 9/1989 | Lazzarini et al. |

(Continued)

FOREIGN PATENT DOCUMENTS

| | | |
|---|---|---|
| JP | 04239751 | 8/1992 |
| JP | 2002050742 | 2/2002 |

(Continued)

OTHER PUBLICATIONS

Notice of Allowance dated Apr. 26, 2017 and English translation from corresponding application No. KR 10-2015-0167367.

(Continued)

*Primary Examiner* — Benny T Lee
(74) *Attorney, Agent, or Firm* — Hauptman Ham, LLP

(57) ABSTRACT

A method of making a semiconductor device includes forming a first transmission line over a substrate. The method includes forming a second transmission line over the substrate. The method further includes depositing a high-k dielectric material between the first transmission line and the second transmission line, wherein the high-k dielectric material partially covers each of the first transmission line and the second transmission line. The method further includes depositing a dielectric material directly contacting the high-k dielectric material, wherein the dielectric material has a different dielectric constant from the high-k dielectric
(Continued)

material, and the dielectric material directly contacts the first transmission line or the second transmission line.

20 Claims, 10 Drawing Sheets

Related U.S. Application Data continuation of application No. 16/734,976, filed on Jan. 6, 2020, now Pat. No. 11,258,151, which is a continuation of application No. 15/696,337, filed on Sep. 6, 2017, now Pat. No. 10,530,030, which is a continuation of application No. 14/748,524, filed on Jun. 24, 2015, now Pat. No. 9,786,976.

(51) Int. Cl.
*H01P 3/08* (2006.01)
*H01P 11/00* (2006.01)

(58) Field of Classification Search
USPC .................................................. 333/238, 243
See application file for complete search history.

(56) References Cited

U.S. PATENT DOCUMENTS

| | | | | |
|---|---|---|---|---|
| 5,276,414 | A | 1/1994 | Fujimoto et al. | |
| 7,081,648 | B2 | 7/2006 | Tsai | |
| 8,168,891 | B1 | 5/2012 | Goergen et al. | |
| 8,279,008 | B2 | 10/2012 | Hsieh et al. | |
| 8,304,659 | B2 | 11/2012 | Goergen | |
| 8,427,240 | B2 | 4/2013 | Hsieh et al. | |
| 8,596,206 | B2 | 11/2013 | Chen et al. | |
| 8,610,494 | B1 | 12/2013 | Jin et al. | |
| 8,618,631 | B2 | 12/2013 | Jin et al. | |
| 9,786,976 | B2 | 10/2017 | Wu et al. | |
| 10,530,030 | B2 | 1/2020 | Wu et al. | |
| 11,258,151 | B2 | 2/2022 | Wu et al. | |
| 11,664,566 | B2 * | 5/2023 | Wu et al. | H01P 3/082 29/829 |
| 2002/0020917 | A1 | 2/2002 | Hirota et al. | |
| 2005/0237136 | A1 | 10/2005 | Nakatsuka | |
| 2009/0025204 | A1 | 1/2009 | Greeff | |
| 2012/0025924 | A1 | 2/2012 | Yamauchi | |
| 2012/0092230 | A1 | 4/2012 | Hung et al. | |
| 2013/0234305 | A1 | 9/2013 | Lin et al. | |
| 2014/0132333 | A1 | 5/2014 | Jin et al. | |
| 2014/0217546 | A1 | 8/2014 | Yen et al. | |
| 2014/0253262 | A1 | 9/2014 | Hsieh et al. | |
| 2014/0253391 | A1 | 9/2014 | Yen | |

FOREIGN PATENT DOCUMENTS

| | | |
|---|---|---|
| JP | 2012109512 | 6/2012 |
| KR | 20080062556 | 7/2008 |
| KR | 20080092603 | 10/2008 |
| KR | 20100101519 | 9/2010 |

OTHER PUBLICATIONS

Office Action dated Oct. 14, 2016 and English translation from corresponding application No. KR 10-2015-0167367.

* cited by examiner

SEMICONDUCTOR DEVICE AND METHODS, WHERE FIRST AND SECOND TRANSMISSION LINES ARE SURROUNDED BY FIRST AND SECOND HIGH-K DIELECTRIC MATERIALS

PRIORITY CLAIM

This application is a continuation of U.S. application Ser. No. 17/587,581, filed Jan. 28, 2022, now U.S. Pat. No. 11,664,556, issued May 20, 2023, which is a continuation of U.S. application Ser. No. 16/734,976, filed Jan. 6, 2020, now U.S. Pat. No. 11,258,151, issued Feb. 22, 2022, which is a continuation of U.S. application Ser. No. 15/696,337, filed Sep. 6, 2017, now U.S. Pat. No. 10,530,030, which is a continuation of U.S. application Ser. No. 14/748,524, filed Jun. 24, 2015, now U.S. Pat. No. 9,786,976, issued Oct. 10, 2017, which are incorporated herein by references in their entireties.

BACKGROUND

Transmission lines are used to transfer signals between portions of a circuit or system. Transmission lines are often used in radio frequency (RF) circuits. In some approaches, a pair of transmission lines called differential transmission lines are used to transfer signals between separate portions of the circuit or system. As technology nodes for circuits decrease, spacing between adjacent transmission lines decreases.

Unlike conductive lines in an interconnect structure, transmission lines are used to carry signals having alternating current (AC) signals. A length of transmission lines is sufficiently long that a wave nature of the transferred signal impacts performance of the transmission line. In contrast, conductive lines in interconnect structures are often formed without consideration for a wave nature of a signal along the conductive line.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
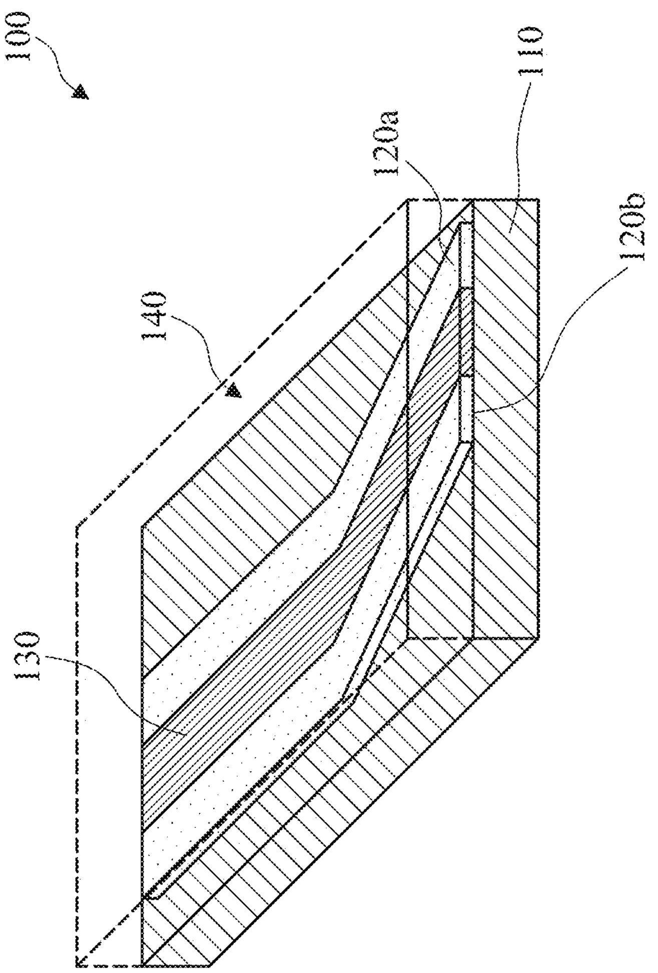
FIG. 1 is a perspective view of a transmission line design according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As spacing between adjacent transmission lines decreases, a risk for cross talk between the transmission lines increases. Differential transmission lines are used to transfer two separate signals for comparison at a receiving end of the transmission lines, so cross talk between differential transmission lines would negatively impact a precision of the signal comparison. In some approaches, an organic dielectric layer is used to separate adjacent transmission lines. However, the organic dielectric layer often does not provide sufficient isolation between the adjacent transmission lines at high frequencies of about 1 gigahertz (GHz) or more. A high-k dielectric material between adjacent transmission lines helps to increase isolation between the transmission lines in order to reduce the risk of cross talk between the transmission lines.

Inclusion of the high-k dielectric material between the transmission lines helps to improve impedance matching in the transmission lines. Impedance is an opposition of the transmission lines to transfer energy of signals along the transmission lines. As a frequency of the signals varies, the impedance will also vary. By increasing isolation between adjacent transmission lines, variation in the impedance due to cross talk between the transmission lines is decreased, which helps to facilitate impedance matching. Impedance matching helps to maintain precise operation of circuitry which depends on the signals from the transmission lines. Impedance matching is a greater concern as a frequency of the transferred signals increases.

Inclusion of the high-k dielectric material between the transmission lines also helps to control quadrature amplitude modulation (QAM). QAM is a modulation scheme used to transfer multiple signals along a same transmission line. QAM involves modulating amplitudes and/or modulating phases of signals in order to distinguish between the multiple signals along the same transmission line.

FIG. 1 is a perspective view of a transmission line design 100 according to some embodiments. Transmission line design 100 includes a substrate 110, a first transmission line 120*a* and a second transmission line 120*b* over the substrate. A high-k dielectric material 130 is between first transmission line 120*a* and second transmission line 120*b*. A dielectric material 140, different from high-k dielectric material 130, surrounds first transmission line 120*a*, second transmission line 120*b* and the high-k dielectric material.

Substrate 110 is configured to provide mechanical support for first transmission line 120*a* and second transmission line 120*b*. In some embodiments, substrate 110 includes silicon, germanium, SiGe or another suitable semiconductor material. In some embodiments, substrate 110 is a semiconductor-on-insulator substrate. In some embodiments, substrate 110 is a printed circuit board (PCB). In some embodiments, substrate 110 is also configured to support active circuitry, such as transistors. In some embodiments, substrate 110 is also configured to support conductive lines in an interconnect structure, which are separate from first transmission line 120*a* and second transmission line 120*b*.

First transmission line 120*a* is configured to transfer at least one signal from one element in a system or circuit to another element in the system or circuit. In some embodiments, first transmission line 120*a* is configured to transfer multiple signals simultaneously. In some embodiments, the multiple signals are modulated with respect to each other. In some embodiments, first transmission line 120*a* includes copper, aluminum, tungsten, alloys thereof or other suitable conductive materials. In some embodiments, first transmission line 120*a* includes graphene or another suitable conductive element.

Second transmission line 120*b* is configured to transfer at least one signal from one element in the system or circuit to the other element in the system or circuit. In some embodiments, the at least one signal transferred by second transmission line 120*b* is a differential signal with respect to a signal transferred by first transmission line 120*a*. In some embodiments, the at least one signal transferred by second transmission line 120*b* is not a differential signal with respect to a signal transferred by first transmission line 120*a*. In some embodiments, second transmission line 120*b* is configured to transfer multiple signals simultaneously. In some embodiments, the multiple signals are modulated with respect to each other. In some embodiments, second transmission line 120*b* includes copper, aluminum, tungsten, alloys thereof or other suitable conductive materials. In some embodiments, first transmission line 120*a* includes graphene or another suitable conductive element. In some embodiments, a material of second transmission line 120*b* is a same material as first transmission line 120*a*. In some embodiments, the material of first transmission line 120*a* is different from the material of second transmission line 120*b*.

High-k dielectric material 130 is configured to increase isolation between first transmission line 120*a* and second transmission line 120*b*. By increasing isolation between first transmission line 120*a* and second transmission line 120*b*, reliability of circuitry connected to the first transmission line and the second transmission line is increased due to the increased impedance matching and reduced cross talk. In some embodiments, a dielectric constant of high-k dielectric material 130 ranges from about 10 to about 20,000 at 1 GHz. If the dielectric constant is too low, then high-k dielectric material 130 does not provide sufficient isolation between first transmission line 120*a* and second transmission line 120*b*, in some instances. If the dielectric constant is too high, then high-k dielectric material 130 is difficult to reliably manufacture, in some instances. In some embodiments, the dielectric constant of high-k dielectric material 130 ranges from about 7,000 to about 12,000. This narrower range provides increased isolation in comparison with lower dielectric constant values and increases case of manufacture in comparison with other approaches, in some instances. In some embodiments, the dielectric constant of high-k dielectric material 130 is about 10,000.

In some embodiments, high-k dielectric material 130 includes a dielectric material such as $BaTiO_3$, $SiO_2$, $HfO_2$, $ZrO_2$, $TiO_2$, $La_2O_3$, $SrTiO_3$, $ZrSiO_4$, $HfSiO_4$, or other suitable dielectric materials. In some embodiments, high-k dielectric material 130 includes the dielectric material and a mixing agent such as resin, ink, epoxy, polyimide or another suitable mixing agent in order to increase case of manufacture of the high-k dielectric material.

Transmission line design 100 includes a top surface of high-k dielectric material 130 being substantially coplanar with a top surface of first transmission line 120*a* and second transmission line 120*b*. In some embodiments, high-k dielectric material 130 is formed by screen printing, photolithography, inkjet printing or another suitable formation process.

Dielectric material 140 is configured to provide isolation between first transmission line 120*a*, second transmission line 120*b* and surrounding elements. In some embodiments, additional transmission lines are located within dielectric material 140. In some embodiments, an interconnect structure is located within dielectric material 140. Dielectric material 140 is different from high-k dielectric material 130. In some embodiments, dielectric material 140 is an organic dielectric material. In some embodiments, dielectric material 140 includes an epoxy, polyimide, benzocyclobutene (BCB), polybenzoxazole (PBO) or another suitable dielectric material. Dielectric material 140 is a same thickness as corresponding dielectric materials in transmission line designs which do not include high-k dielectric material 130.

In operation of transmission line design 100, a first signal is transferred through first transmission line 120*a* and a second signal is transferred through second transmission line 120*b*. A total inductance of transmission line design 100 is determined based on an inductance of first transmission line 120*a*, an inductance of second transmission line 120*b*, and a joint inductance between the first transmission line and the second transmission line. In situations where the first signal and the second signal are transferred in a same direction, the joint inductance is added to the inductance of first transmission line 120*a* and the inductance of second transmission line 120*b*. In situations where the first signal and the second signal are transferred in opposite directions, the joint inductance is subtracted from a sum of the inductance of first transmission line 120*a* and the inductance of second transmission line 120*b*. Including high-k dielectric material 130 reduces a magnitude of the joint inductance. By reducing a magnitude of the joint inductance, designing circuitry connected to first transmission line 120*a* and second transmission line 120*b* is simplified because the impedance of transmission line design 100 is less dependent on the joint inductance.

Figure 2:
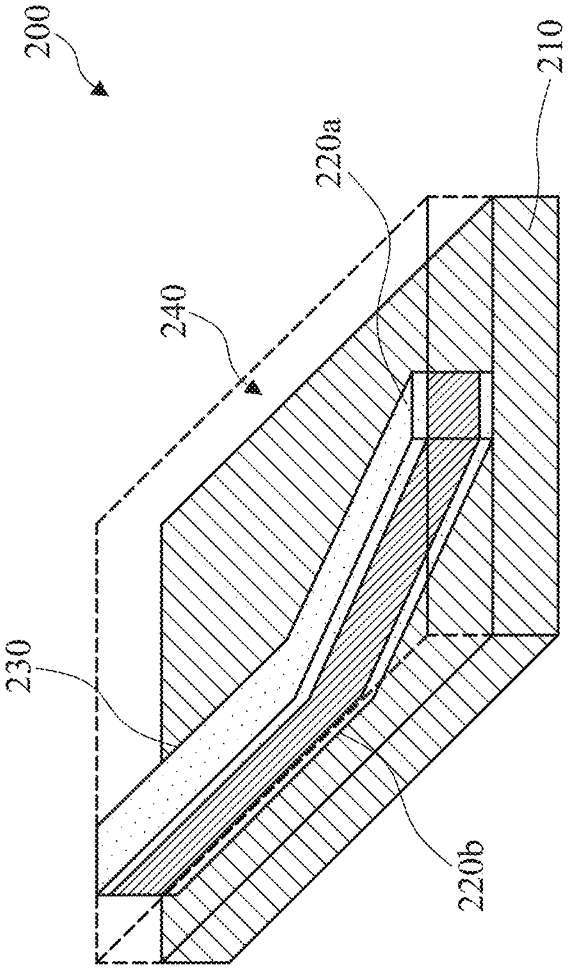
FIG. 2 is a perspective view of a transmission line design according to some embodiments.

FIG. 2 is a perspective view of a transmission line design 200 in accordance with some embodiments. Elements in transmission line design 200 which are the same as elements in transmission line design 100 (FIG. 1) have a same reference number increased by 100. In comparison with transmission line design 100 (FIG. 1), transmission line design 200 includes second transmission line 220*b* on a different level with respect to first transmission line 220*a*. A "different level" means that a distance between second transmission line 220*b* and substrate 210 is different from a distance between first transmission line 220*a* and the substrate.

High-k dielectric material 230 remains between first transmission line 220*a* and second transmission line 220*b*.

In contrast with high-k dielectric material 130 (FIG. 1), high-k dielectric material 230 is between first transmission line 220*a* and second transmission line 220*b* in a direction perpendicular to a top surface of substrate 210. In some embodiments, a combination of first transmission line 220*a*, high-k dielectric material 230 and second transmission line 220*b* is called a transmission line stack. In some embodiments, multiple transmission line stacks are present in dielectric material 240.

Figure 3A:
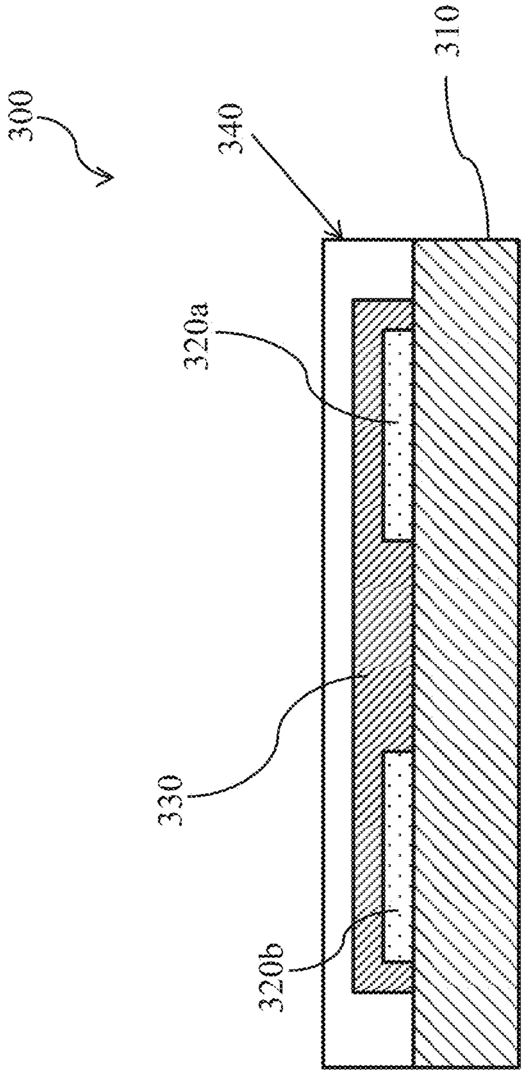
FIGS. 3A and 3B are cross-sectional views of transmission line designs according to some embodiments.

FIG. 3A is a cross-sectional view of a transmission line design 300 in accordance with some embodiments. Elements in transmission line design 300 which are the same as elements in transmission line design 100 (FIG. 1) have a same reference number increased by 200. In comparison with transmission line design 100, transmission line design 300 includes high-k dielectric material 330 extending over a top surface of first transmission line 320*a* and second transmission line 320*b* and covering both sidewalls of each of the first transmission line 320*a* and the second transmission line 320*b*. In comparison with high-k dielectric material 130 (FIG. 1), high-k dielectric material 330 helps to increase isolation between first transmission line 320*a* and surrounding elements; and between second transmission line 320*b* and surrounding elements. The transmission line design 300 includes a substrate 310.

In some embodiments which include additional transmission lines on a different level from first transmission line 320*a* and second transmission line 320*b*, high-k dielectric material 330 helps to increase isolation of the first and second transmission lines from the additional transmission lines in comparison with high-k dielectric material 130 (FIG. 1). In some embodiments which include an interconnect structure in dielectric material 340, high-k dielectric material 330 helps to increase isolation of the first and second transmission lines from the interconnect structure in comparison with high-k dielectric material 130 (FIG. 1).

In comparison with transmission line design 100 (FIG. 1), transmission line design 300 has a higher production cost due to the increase in the amount of high-k dielectric material 330 relative to high-k dielectric material 130 (FIG. 1).

In some embodiments, a top surface of high-k dielectric material 330 is substantially co-planar with a top surface of first transmission line 320*a* and second transmission line 320*b*; but high-k dielectric material 330 still surrounds sidewalls of the first and second transmission lines 320*a* and 320*b*, respectively.

Figure 3B:
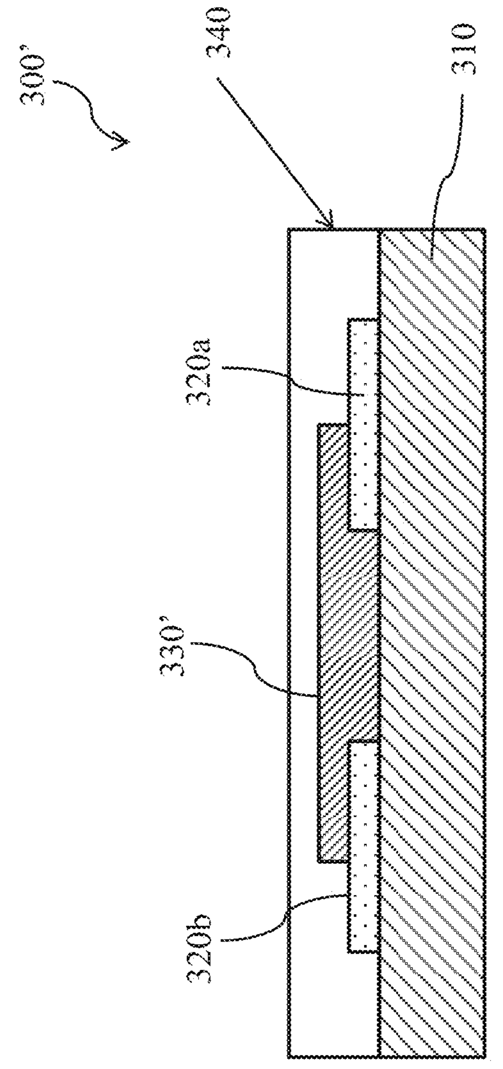

FIG. 3B is a cross-sectional view of a transmission line design 300' in accordance with some embodiments. Elements in transmission line design 300' which are the same as elements in transmission line design 100 (FIG. 1) have a same reference number increased by 200. In comparison with transmission line design 300 (FIG. 3A), transmission line design 300' includes high-k dielectric material 330' extending over a portion of a top surface of first transmission line 320*a* and second transmission line 320*b* and exposing sidewalls of each of the first transmission line and the second transmission line farthest from the adjacent transmission line. In comparison with high-k dielectric material 130 (FIG. 1), high-k dielectric material 330' helps to increase isolation between first transmission line 320*a* and surrounding elements; and between second transmission line 320*b* and surrounding elements. In some embodiments, high-k dielectric material 330' extends over an entirety of the top surface of first transmission line 320*a* and second transmission line 320*b*. The transmission line design 300' includes a substrate 310.

In some embodiments which include additional transmission lines on a different level from first transmission line 320*a* and second transmission line 320*b*, high-k dielectric material 330' helps to increase isolation of the first and second transmission lines from the additional transmission lines in comparison with high-k dielectric material 130 (FIG. 1). In some embodiments which include an interconnect structure in dielectric material 340, high-k dielectric material 330' helps to increase isolation of the first and second transmission lines from the interconnect structure in comparison with high-k dielectric material 130 (FIG. 1).

In comparison with transmission line design 100 (FIG. 1), transmission line design 300' has a higher production cost due to the increase in the amount of high-k dielectric material 330' relative to high-k dielectric material 130 (FIG. 1).

Figure 4A:
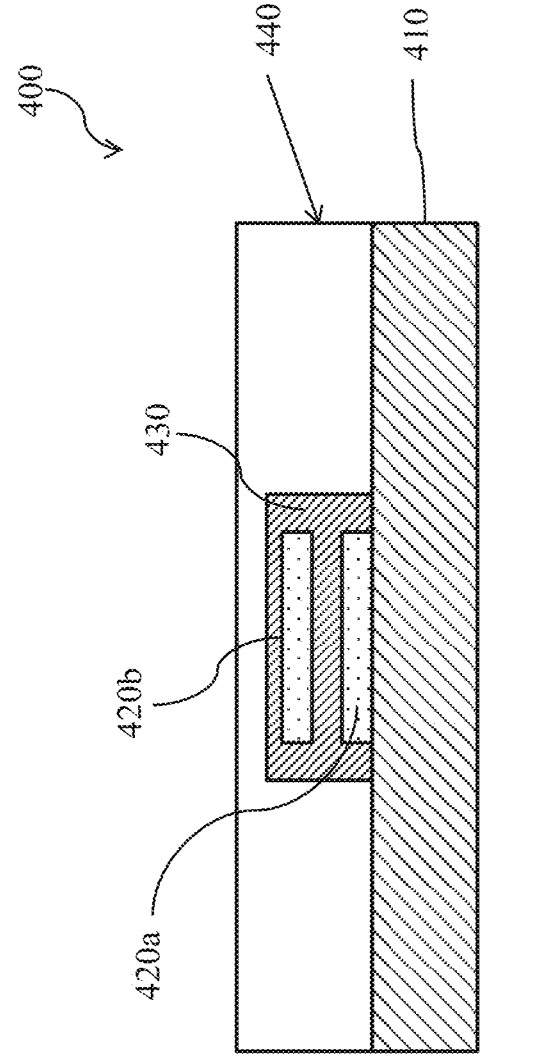
FIGS. 4A-4C are cross-sectional views of transmission line designs according to some embodiments.

FIG. 4A is a cross-sectional view of a transmission line design 400 in accordance with some embodiments. Elements in transmission line design 400 which are the same as elements in transmission line design 200 (FIG. 2) have a same reference number increased by 200. In comparison with transmission line design 200 (FIG. 2), transmission line design 400 includes high-k dielectric material 430 extending over a top surface of first transmission line 420*a* and second transmission line 420*b* and covering both sidewalls of each of the first transmission line 420*a* and the second transmission line 420*b*. In comparison with high-k dielectric material 230 (FIG. 2), high-k dielectric material 430 helps to increase isolation between first transmission line 420*a* and surrounding elements; and between second transmission line 420*b* and surrounding elements. The transmission line design 400 includes a substrate 410.

In some embodiments which include additional transmission lines on a same level as at least one of first transmission line 420*a* or second transmission line 420*b*, high-k dielectric material 430 helps to increase isolation of the first and second transmission lines from the additional transmission lines in comparison with high-k dielectric material 230 (FIG. 2). In some embodiments which include an interconnect structure in dielectric material 440, high-k dielectric material 430 helps to increase isolation of the first and second transmission lines from the interconnect structure in comparison with high-k dielectric material 230 (FIG. 2).

In comparison with transmission line design 200 (FIG. 2), transmission line design 400 has a higher production cost due to the increase in the amount of high-k dielectric material 430 relative to high-k dielectric material 230 (FIG. 2).

Figure 4B:
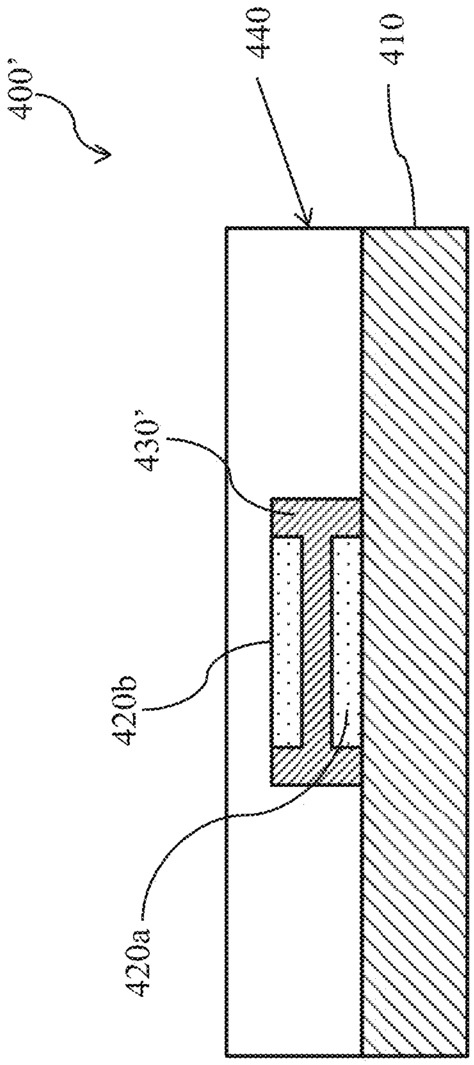

FIG. 4B is a cross-sectional view of a transmission line design 400' in accordance with some embodiments. Elements in transmission line design 400' which are the same as elements in transmission line design 200 (FIG. 2) have a same reference number increased by 200. In comparison with transmission line design 400 (FIG. 4A), transmission line design 400' includes high-k dielectric material 430' extending over a portion of a sidewall surfaces of first transmission line 420*a* and second transmission line 420*b* (FIG. 4A) and exposing the top surface of the second transmission line. In comparison with high-k dielectric material 230 (FIG. 2), high-k dielectric material 430' helps to increase isolation between first transmission line 420*a* and surrounding elements; and between second transmission line 420*b* and surrounding elements. In some embodiments, high-k dielectric material 430' extends over less than an entirety of the sidewall surfaces of at least one of first transmission line 420*a* or second transmission line 420*b*. The transmission line design 400' includes a substrate 410.

In some embodiments which include additional transmission lines on a same level as at least one of first transmission line 420*a* or second transmission line 420*b*, high-k dielectric material 430' helps to increase isolation of the first and second transmission lines from the additional transmission lines in comparison with high-k dielectric material 230 (FIG. 2). In some embodiments which include an interconnect structure in dielectric material 440, high-k dielectric material 430' helps to increase isolation of the first and second transmission lines from the interconnect structure in comparison with high-k dielectric material 230 (FIG. 2).

In comparison with transmission line design 200 (FIG. 2), transmission line design 400' has a higher production cost due to the increase in the amount of high-k dielectric material 430' relative to high-k dielectric material 230 (FIG. 2).

Figure 4C:
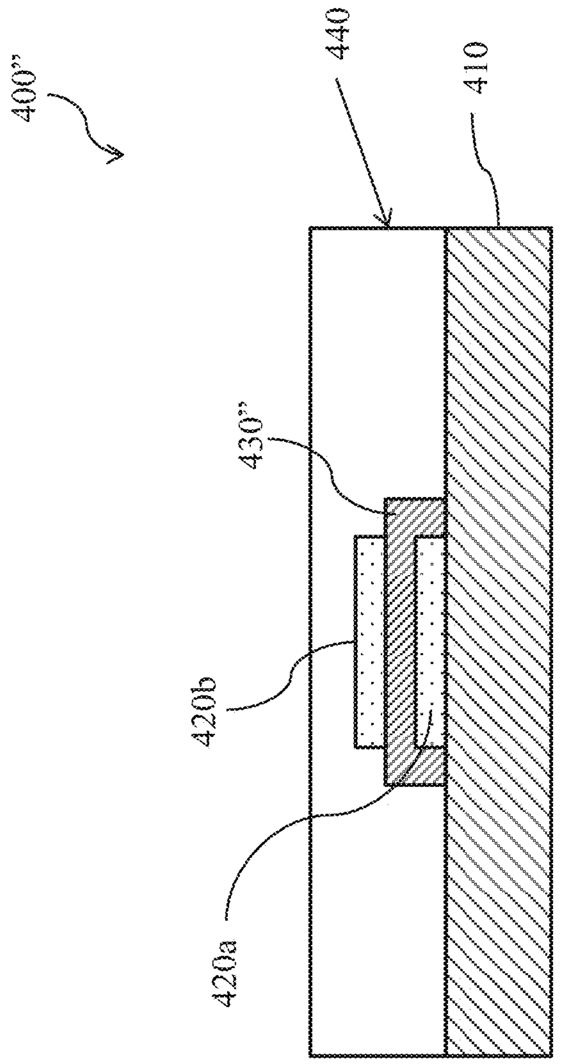

FIG. 4C is a cross-sectional view of a transmission line design 400" in accordance with some embodiments. Elements in transmission line design 400" which are the same as elements in transmission line design 200 (FIG. 2) have a same reference number increased by 200. In comparison with transmission line design 400 (FIG. 4A) and transmission line design 400' (FIG. 4B), transmission line design 400" includes high-k dielectric material 430" extending over a portion of sidewall surfaces of first transmission line 420*a* and exposed sidewalls and top surface of second transmission line 420*b*. In comparison with high-k dielectric material 230 (FIG. 2), high-k dielectric material 430" helps to increase isolation between first transmission line 420*a* and surrounding elements; and between second transmission line 420*b* and surrounding elements. In some embodiments, high-k dielectric material 430" extends over less than an entirety of the sidewall surfaces of first transmission line 420*a*. The transmission line design 400" includes a substrate 410.

In some embodiments which includes additional transmission lines on a same level as at least one of first transmission line 420*a* or second transmission line 420*b*, high-k dielectric material 430" helps to increase isolation of the first and second transmission lines from the additional transmission lines in comparison with high-k dielectric material 230 (FIG. 2). In some embodiments which includes an interconnect structure in dielectric material 440, high-k dielectric material 430" helps to increase isolation of the first and second transmission lines from the interconnect structure in comparison with high-k dielectric material 230 (FIG. 2).

In comparison with transmission line design 200 (FIG. 2), transmission line design 400" has a higher production cost due to the increase in the amount of high-k dielectric material 430" relative to high-k dielectric material 230 (FIG. 2).

Figure 5A:
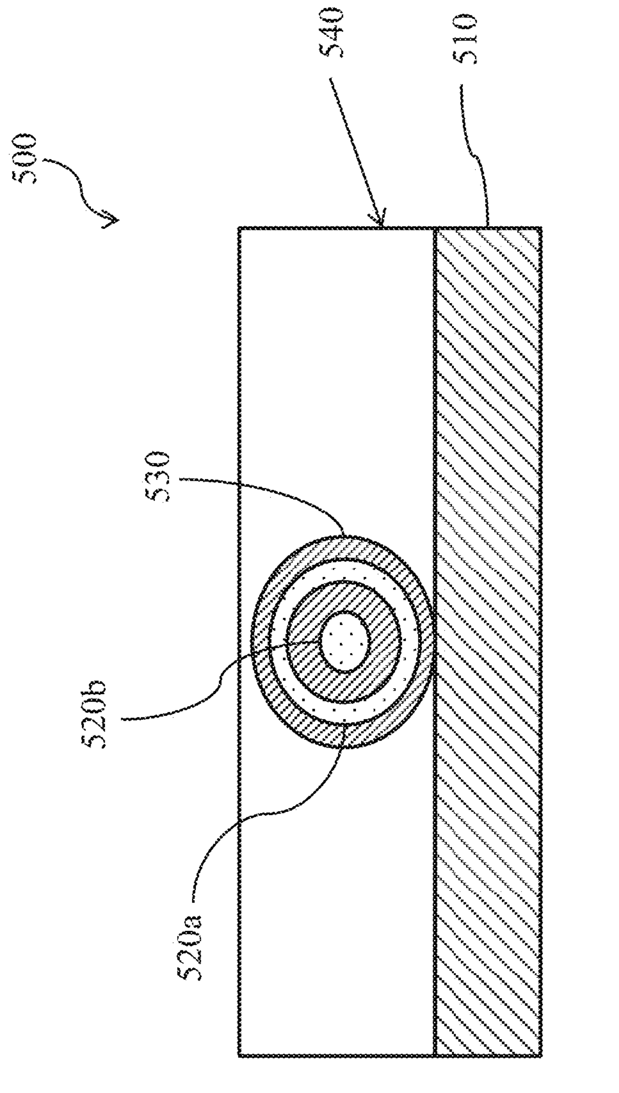
FIGS. 5A and 5B are cross-sectional views of transmission line designs according to some embodiments.

FIG. 5A is a cross-sectional view of a transmission line design 500 in accordance with some embodiments. Elements in transmission line design 500 which are the same as elements in transmission line design 100 (FIG. 1) have a same reference number increased by 400. In comparison with transmission line design 100, transmission line design 500 is a co-axial arrangement of first transmission line 520*a* and second transmission line 520*b*. Transmission line design 500 includes high-k dielectric material 530 extending over an outer surface of first transmission line 520*a* and second transmission line 520*b*. In comparison with high-k dielectric material 130 (FIG. 1), high-k dielectric material 530 helps to increase isolation between first transmission line 520*a* and surrounding elements; and between second transmission line 520*b* and surrounding elements. The transmission line design 500 includes a substrate 510.

In some embodiments which include additional transmission lines on a same level or different level from as at least one of first transmission line 520*a* or second transmission line 520*b*, high-k dielectric material 530 helps to increase isolation of the first transmission line 520*a* and second transmission line 520*b* from the additional transmission lines in comparison with high-k dielectric material 130 (FIG. 1). In some embodiments which include an interconnect structure in dielectric material 540, high-k dielectric material 530 helps to increase isolation of the first and second transmission lines from the interconnect structure in comparison with high-k dielectric material 130 (FIG. 1).

In comparison with transmission line design 100 (FIG. 1), transmission line design 500 has a higher production cost due to the increase in the amount of high-k dielectric material 530 relative to high-k dielectric material 130 (FIG. 1); and because of additional processing used to form the coaxial arrangement in transmission line design 500.

Figure 5B:
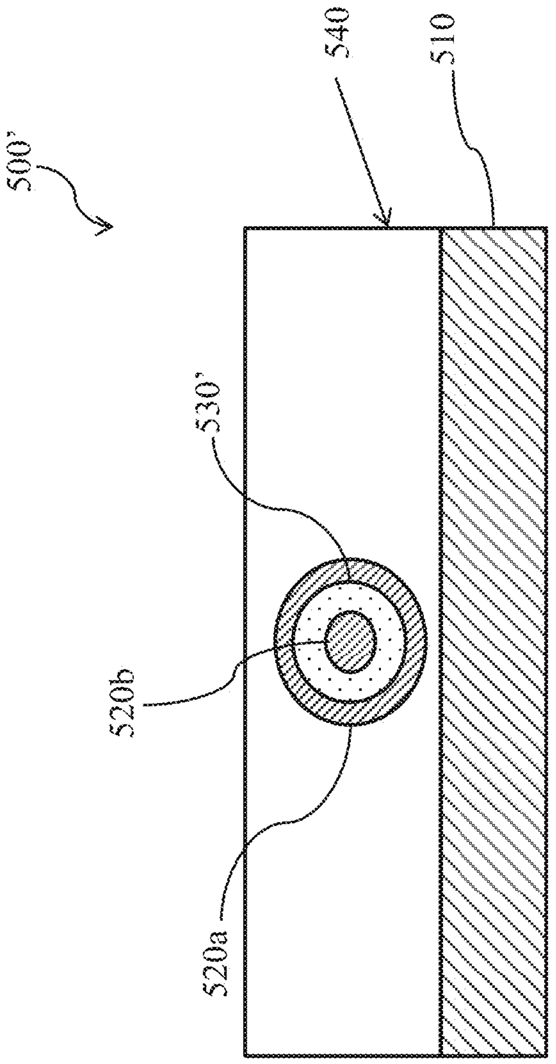

FIG. 5B is a cross-sectional view of a transmission line design 500' in accordance with some embodiments. Elements in transmission line design 500' which are the same as elements in transmission line design 100 (FIG. 1) have a same reference number increased by 400. In comparison with transmission line design 500 (FIG. 5A), transmission line design 500' includes high-k dielectric material 530' extending over an outer surface of second transmission line 520*b* and exposing the outer surface of first transmission line 520*a*. In comparison with high-k dielectric material 130 (FIG. 1), high-k dielectric material 530' helps to increase isolation between second transmission line 520*b* and surrounding elements. The transmission line design 500' includes a substrate 510.

In some embodiments, multiple coaxially arranged transmission lines are included in a transmission line design. In some embodiments, at least one coaxial arrangement includes high-k dielectric material over an outer surface of an outer-most transmission line, as in transmission line design 500 (FIG. 5A) and at least one coaxial arrangement includes high-k dielectric material exposing an outer surface of an outer-most transmission line, as in transmission line design 500' (FIG. 5B).

In some embodiments, more than two transmission lines are coaxially arranged. In some embodiments, an outer surface of an outer-most transmission line is exposed by high-k dielectric material. In some embodiments, the outer surface of an outer-most transmission line is covered by high-k dielectric material.

Figure 6:
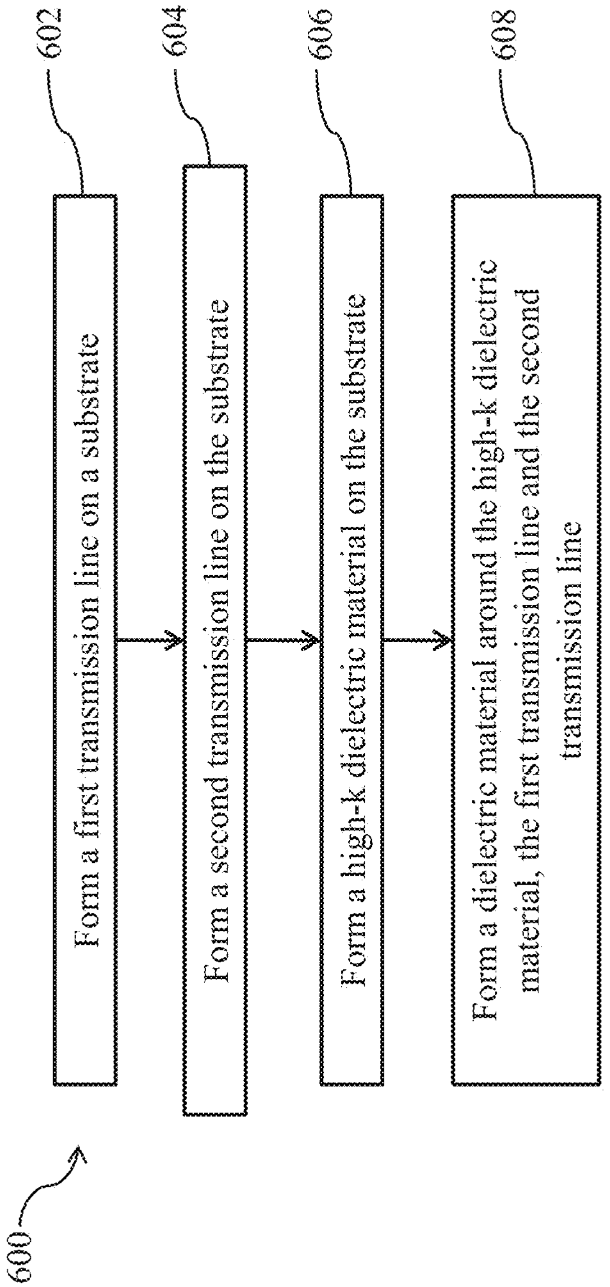
FIG. 6 is a flowchart of a method of making a transmission design according to some embodiments.

FIG. 6 is a flowchart of a method 600 of forming a transmission line design in accordance with some embodiments. In operation 602, a first transmission line is formed on a substrate. The first transmission line, e.g., first transmission line 120*a* (FIG. 1), first transmission line 220*a* (FIG. 2), first transmission line 320*a* (FIGS. 3A-3B), first transmission line 420*a* (FIG. 4A-4C), or first transmission line 520*a* (FIGS. 5A-5B), is usable to transfer at least one signal from one element in a circuit or system to another element in the circuit or system. In some embodiments, the first transmission line is formed by plating, physical vapor deposition (PVD), chemical vapor deposition (CVD), atomic layer deposition (ALD), or another suitable formation process. In some embodiments, the first transmission line is formed in direct contact with the substrate. In some embodiments, the first transmission line is formed spaced apart from the substrate.

In operation 604, a second transmission line is formed on a substrate. The second transmission line, e.g., second transmission line 120*b* (FIG. 1), second transmission line 220*b* (FIG. 2), second transmission line 320*b* (FIGS. 3A-3B), second transmission line 420*b* (FIG. 4A-4C), or second transmission line 520*b* (FIGS. 5A-5B), is usable to transfer at least one signal from one element in a circuit or system to another element in the circuit or system. In some embodiments, the second transmission line is formed by plating, PVD, CVD, ALD, or another suitable formation process. In some embodiments, the first transmission line is formed using a same process as the process used to form the second transmission line. In some embodiments, the first transmission line is formed using a different process from the process used to form the second transmission line.

In some embodiments, the second transmission line is formed in direct contact with the substrate. In some embodiments, the second transmission line is formed spaced apart from the substrate. In some embodiments, the first transmission line is formed on a same level as the second transmission line. In some embodiments, the first transmission line is formed on a different level from the second transmission line.

In some embodiments, the first transmission line is formed simultaneously with the second transmission line. In some embodiments, the first transmission line is formed sequentially with the second transmission line. In some embodiments, a first portion of the first transmission line is formed prior to formation of the second transmission line; and a second portion of the first transmission line is formed after formation of the second transmission line.

In operation 606, a high-k dielectric material is formed on the substrate. The high-k dielectric material, e.g., high-k dielectric material 130 (FIG. 1), high-k dielectric material 230 (FIG. 2), high-k dielectric material 330 (FIG. 3A), high-k dielectric material 330' (FIG. 3B), high-k dielectric material 430 (FIG. 4A), high-k dielectric material 430' (FIG. 4B), high-k dielectric material 430" (FIG. 4C), high-k dielectric material 530 (FIG. 5A), or high-k dielectric material 530' (FIG. 5B), is configured to increase isolation between the first transmission line and the second transmission line. In some embodiments, the high-k dielectric material is formed using screen printing, photolithography, inkjet printing or another suitable formation process.

An order of operations 602, 604 and 606 depends on a structure of the transmission line design to be formed. In some embodiments where the first transmission line and the second transmission line are on a same level, operation 606 is performed after operations 602 and 604 are performed. In some embodiments where the first transmission line and the second transmission line are on a same level, operation 606 is performed after one of operations 602 or 604 is performed. In some embodiments where the first transmission line and the second transmission line are on different levels, operation 606 is performed prior to operation 604.

In some embodiments, the high-k dielectric material is formed before at least one of the first transmission line or the second transmission line. In some embodiments, the high-k dielectric material is formed after both of the first transmission line and the second transmission line. In some embodiments, a first portion of the high-k dielectric material is formed prior to at least one of the first transmission line or the second transmission line; and a second portion of the high-k dielectric material is formed after at least one of the first transmission line or the second transmission line.

In operation 608, a dielectric material is formed around the high-k dielectric material, the first transmission line, and the second transmission line. The dielectric material, e.g., dielectric material 140 (FIG. 1), dielectric material 240 (FIG. 2), dielectric material 340 (FIGS. 3A-3B), dielectric material 440 (FIG. 4A-4C), or dielectric material 540 (FIG. 5A-5B), is configured to provide isolation between the first transmission line and surrounding elements; and between the second transmission line and the surrounding elements. In some embodiments, the dielectric material is formed using sputtering, PVD, CVD, ALD, printing or another suitable formation process.

In some embodiments, the dielectric material is formed after the high-k dielectric material, the first transmission line, and the second transmission line. In some embodiments, the dielectric material is formed prior to at least one of the high-k dielectric material, the first transmission line or the second transmission line. In some embodiments, an opening is formed in the dielectric material, using etching, drilling, or another suitable process, and at least one of the first transmission line, the second transmission line or the high-k dielectric material is formed in the opening. In some embodiments where an opening is formed in the dielectric material, the dielectric material is used to fill a remaining portion of the opening following formation of the first transmission line, the second transmission line or the high-k dielectric material. In some embodiments, a first portion of the dielectric material is formed prior to at least one of the high-k dielectric material, the first transmission line or the second transmission line; and a second portion of the dielectric material is formed after at least one of the high-k dielectric material, the first transmission line or the second transmission line.

In some embodiments where the transmission line design has a coaxial arrangement, a first portion of the dielectric layer is formed followed by forming a recess in the dielectric layer. A first portion of the first transmission line is formed in the recess followed by a first portion of the high-k dielectric layer and then the second transmission line. In some embodiments, the second transmission line will extend above a top surface of the first portion of the dielectric layer. Following formation of the second transmission line, a second portion of the high-k dielectric layer is formed over the second transmission line to enclose the second transmission line with the first and second portions of the high-k dielectric material. A second portion of the first transmission line is then formed over the high-k dielectric material to enclose the high-k dielectric material in the first portion and the second portion of the first transmission line.

In some embodiments, an order of operations in method 600 is changed based on an arrangement of the high-k dielectric material, the first transmission line and the second transmission line in the transmission line design. In some embodiments, additional operations are included in method 600, such as patterning processes, planarization process, cleaning processes, or other suitable processes.

An aspect of this description relates to a method of making a semiconductor device. The method includes forming a first transmission line over a substrate. The method includes forming a second transmission line over the substrate. The method further includes depositing a high-k dielectric material between the first transmission line and the second transmission line, wherein the high-k dielectric material partially covers each of the first transmission line and the second transmission line. The method further includes depositing a dielectric material directly contacting the high-k dielectric material, wherein the dielectric material has a different dielectric constant from the high-k dielectric material, and the dielectric material directly contacts the first transmission line or the second transmission line. In some embodiments, forming the second transmission line comprise forming the second transmission line having a top-most surface coplanar with a top-most surface of the first transmission line. In some embodiments, depositing the dielectric material comprises depositing the dielectric material in direct contact with the first transmission line. In some embodiments, depositing the dielectric material comprises depositing the dielectric material in direct contact with the second transmission line. In some embodiments, depositing the high-k dielectric material comprises filling a space between the first transmission line and the second transmission line with the high-k dielectric material. In some embodiments, depositing the dielectric material comprises depositing the dielectric material contacting a sidewall of the first transmission line and contacting a sidewall of the second transmission line. In some embodiments, depositing the dielectric material comprises depositing the dielectric material in direct contact with the high-k dielectric material.

An aspect of this description relates to a method of making semiconductor device. The method includes forming a first transmission line over a substrate. The method further includes forming a second transmission line over the substrate. The method further includes depositing a high-k dielectric material between the first transmission line and the second transmission line, wherein an entirety of the second transmission line is above the high-k dielectric material. The method further includes depositing a dielectric material directly contacting the high-k dielectric material, wherein the dielectric material has a different dielectric constant from the high-k dielectric material, the dielectric material directly contacts the second transmission line, and the dielectric material is separated from the first transmission line. In some embodiments, depositing the high-k dielectric material comprises depositing the high-k dielectric material along a top-most surface and along sidewalls of the first transmission line. In some embodiments, forming the second transmission line comprises forming the second transmission line in direct contact with the high-k dielectric material. In some embodiments, forming the first transmission line comprises forming the first transmission line comprising copper, aluminum, tungsten, or graphene. In some embodiments, forming the second transmission line comprises forming the second transmission line including a same material as the first transmission line. In some embodiments, depositing the high-k dielectric material comprises depositing the high-k dielectric material having a dielectric constant ranging from about 10 to about 20,000 at 1 Gigahertz (GHz). In some embodiments, depositing the dielectric material comprises depositing the dielectric material in direct contact with a top-most surface of the high-k dielectric material.

An aspect of this description relates to a semiconductor device. The semiconductor device includes a first transmission line. The semiconductor device includes a second transmission line, wherein the first transmission line is concentric with the second transmission line. The semiconductor device further includes a first high-k dielectric layer between the first transmission line and the second transmission line. The semiconductor device further includes a second high-k dielectric material surrounding the first transmission line, wherein the first high-k dielectric layer is concentric with the second high-k dielectric layer. In some embodiments, the semiconductor device further includes a dielectric material in direct contact with the second high-k dielectric material. In some embodiments, the dielectric material is separated from both the first transmission line and the second transmission line. In some embodiments, the first high-k dielectric material comprises a same material as the second high-k dielectric material. In some embodiments, the first transmission line comprises copper, aluminum, tungsten, or graphene. In some embodiments, the second transmission line comprises a same material as the first transmission line.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of making a semiconductor device comprising:
- forming a first transmission line over a substrate;
- forming a second transmission line over the substrate;
- depositing a high-k dielectric material between the first transmission line and the second transmission line, wherein the high-k dielectric material partially covers each of the first transmission line and the second transmission line; and
- depositing a dielectric material directly contacting the high-k dielectric material, wherein the dielectric material has a different dielectric constant from the high-k dielectric material, and the dielectric material directly contacts the first transmission line or the second transmission line.

2. The method of claim 1, wherein forming the second transmission line comprises forming the second transmission line having a top-most surface coplanar with a top-most surface of the first transmission line.

3. The method of claim 1, wherein depositing the dielectric material comprises depositing the dielectric material in direct contact with the first transmission line.

4. The method of claim 3, wherein depositing the dielectric material comprises depositing the dielectric material in direct contact with the second transmission line.

5. The method of claim 1, wherein depositing the high-k dielectric material comprises filling a space between the first transmission line and the second transmission line with the high-k dielectric material.

6. The method of claim 1, wherein depositing the dielectric material comprises depositing the dielectric material contacting a sidewall of the first transmission line and contacting a sidewall of the second transmission line.

7. The method of claim 1, wherein depositing the dielectric material comprises depositing the dielectric material in direct contact with both the first transmission line and the second transmission line.

8. A method of making a semiconductor device comprising:
- forming a first transmission line over a substrate;
- forming a second transmission line over the substrate;
- depositing a high-k dielectric material between the first transmission line and the second transmission line, wherein an entirety of the second transmission line is above the high-k dielectric material; and
- depositing a dielectric material directly contacting the high-k dielectric material, wherein the dielectric material has a different dielectric constant from the high-k dielectric material, the dielectric material directly contacts the second transmission line, and the dielectric material is separated from the first transmission line.

9. The method of claim 8, wherein depositing the high-k dielectric material comprises depositing the high-k dielectric material along a top-most surface and along sidewalls of the first transmission line.

10. The method of claim 8, wherein forming the second transmission line comprises forming the second transmission line in direct contact with the high-k dielectric material.

11. The method of claim 8, wherein forming the first transmission line comprises forming the first transmission line comprising copper, aluminum, tungsten, or graphene.

12. The method of claim 11, wherein forming the second transmission line comprises forming the second transmission line including a same material as the first transmission line.

13. The method of claim 8, wherein depositing the high-k dielectric material comprises depositing the high-k dielectric material having a dielectric constant ranging from about 10 to about 20,000 at 1 Gigahertz (GHz).

14. The method of claim 8, wherein depositing the dielectric material comprises depositing the dielectric material in direct contact with a top-most surface of the high-k dielectric material.

15. A semiconductor device comprising:

a first transmission line;

a second transmission line, wherein the first transmission line is concentric with the second transmission line;

a first high-k dielectric layer between the first transmission line and the second transmission line; and a second high-k dielectric material surrounding the first transmission line, wherein the first high-k dielectric layer is concentric with the second high-k dielectric layer.

16. The semiconductor device of claim 15, further comprising a dielectric material in direct contact with the second high-k dielectric material.

17. The semiconductor device of claim 16, wherein the dielectric material is separated from both the first transmission line and the second transmission line.

18. The semiconductor device of claim 15, wherein the first high-k dielectric material comprises a same material as the second high-k dielectric material.

19. The semiconductor device of claim 15, wherein the first transmission line comprises copper, aluminum, tungsten, or graphene.

20. The semiconductor device of claim 19, wherein the second transmission line comprises a same material as the first transmission line.

* * * * *